SYSTEM FOR CORRECTING VIDEO SIGNALS

Filed April 30, 1964 4 Sheets-Sheet 1

INVENTORS
Tomiyuki Tanaka
Yuzuru Inoue
BY Stevens, Davis, Miller & Mosher
ATTORNEYS Feb. 27, 1968 TOMIYUKI TANAKA ET AL 3,371,158

SYSTEM FOR CORRECTING VIDEO SIGNALS

Filed April 30, 1964 4 Sheets-Sheet 2

INVENTORS

Tomiyuki Tanaka

Yuzuru Inoue

BY Stevens, Davis, Miller & Mosher

ATTORNEYS

INVENTORS
Tomiyuki Tanaka
Yuzuru Inoue
BY Stevens, Davis, Miller & Mosher
ATTORNEYS

SYSTEM FOR CORRECTING VIDEO SIGNALS

Filed April 30, 1964 4 Sheets-Sheet 4

INVENTORS
Tomiyuki Tanaka
Yuzuru Inoue
BY Stevens, Davis, Miller & Mosher
ATTORNEY 3,371,158
SYSTEM FOR CORRECTING VIDEO SIGNALS
Tomiyuki Tanaka, Meguro-ku, Tokyo, and Yuzuru Inoue, Machida, Tokyo, Japan, assignors to Victor Company of Japan, Limited, Yokohama, Japan
Filed Apr. 30, 1964, Ser. No. 363,914
Claims priority, application Japan, May 4, 1963, 38/23,192
4 Claims. (Cl. 178—6.6)

ABSTRACT OF THE DISCLOSURE

A video tape reproducing system in which a carrier wave of predetermined frequency corresponding to the horizontal synchronizing signal is separated out of the reproduced video signal and compared to a standard frequency signal produced by a reference generator so that a signal is developed which corresponds to the comparison of the standard signal and carrier signal phase relationships. The system includes a variable delay circuit which receives the reproduced demodulated video signal and imparts a delay thereto in accordance with the value of the comparison signal. The variable delay circuit has the capability of having a digital time interval variation characteristic.

The present invention relates to a system for correcting video signals for use in a magnetic television video signal recording and reproducing apparatus, particularly, a system for minutely and continuously correcting an error of the time intervals of the video output signal.

The present invention is intended to provide a system for correcting an error of the time intervals of the video output signal, which makes it possible to reproduce the video signal recorded on a magnetic tape by means of a reproducing head, derive a carrier wave from the signal thus reproduced, compare the phase of said carrier wave with that of a standard signal having a frequency corresponding to the carrier frequency, detect a voltage equal to the difference between the two, and control a device for variably delaying the video signal with the aid of said voltage detected.

The principal object of the invention is to provide a system for obtaining a stabilized television reproduced picture image.

Another object of the invention is to provide a system for minutely and continuously correcting the time intervals of the reproduced video output signal.

Further object of the invention is to provide a system for obviating jitter to be occurred in the reproduced signal.

For a better understanding of the invention, reference is taken to the accompanying drawings, in which, FIG. 1 is a plan view of a magnetic recording and reproducing apparatus incorporating the present invention system;

Figure 1:
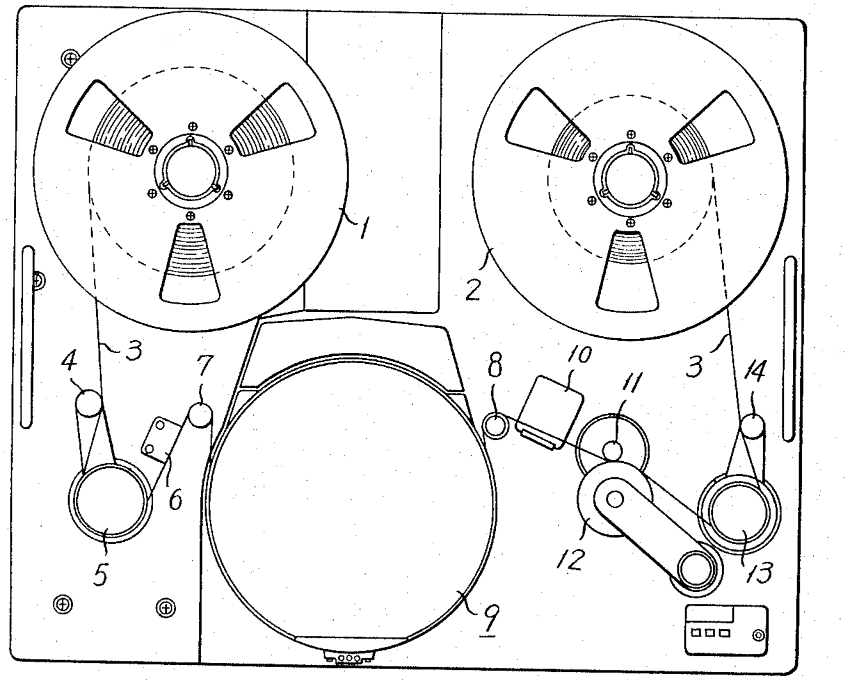

Referring to FIG. 1, 1 represents a supply reel arranged vertically higher than a take-up reel 2. A magnetic tape 3 delivered from the supply reel 1 is fed via a flanged roller 5 having a tension arm 4 and an erasing head 6 to a guide drum 9 enclosing therein a rotary disc 15 to be described hereinafter. The magnetic tape 3 is wound around the guide drum 9 for half the periphery with the aid of guide poles 7 and 8. The magnetic tape 3 is then brought into contact with a stationary magnetic head assembly 10 for recording an audio signal, control signal or erasing audio signal etc. and fed via a capstan 11, a pinch roller 12 adapted to press the tape 3 against the capstan 11 and a flanged roller 13 having a tension arm 14 to the take-up roller 2 where the tape 3 is wound around it.

The magnetic tape is helicoidally wound around the guide drum 9 for substantially half the periphery in a form of letter "Ω" and in a manner such that the axis of the magnetic tape in its lengthwise direction is inclined from the rotating plane of the magnetic heads 16 and 17 installed at 180° on the periphery of the rotary disc 15.

Figure 2:
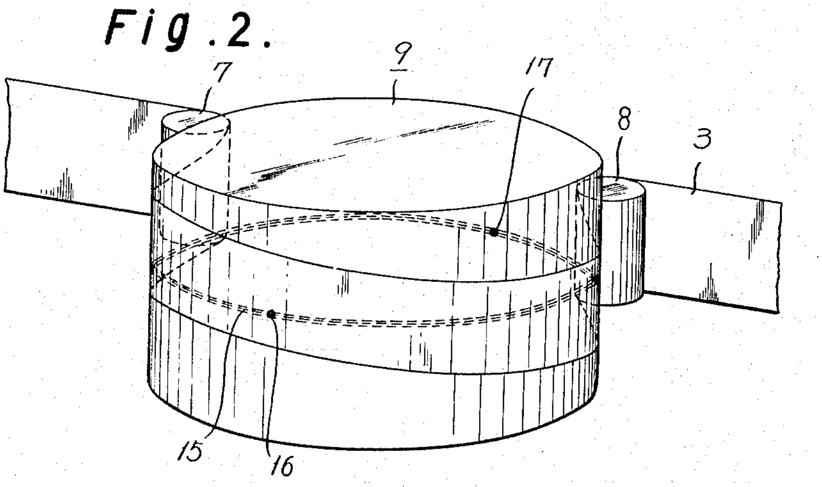
FIG. 2 is an enlarged schematic perspective view showing a guide drum in the apparatus.

A recording operation of the above mentioned apparatus relating to the present invention method is as follows:

The magnetic tape 3 is wound around the guide drum 9 as shown in FIG. 2. The rotating speed of the rotary disc 15 is made extremely greater than the peripheral speed of the magnetic tape 3 so as to scan for the recording on the tape alternately by means of the magnetic heads 16 and 17, recorded tracks sufficiently long and oblique to the lengthwise direction of the tape are obtained on the tape.

Thus the recording of desired signals is achieved and the reproduction may be done in the same operation.

Next, the status how the signals are applied, recorded and reproduced on this apparatus shall be explained with reference to FIG. 3.

Signals to be recorded, for example, television video signals are impressed into a terminal 18 and magnetically recorded tracks 23 are formed on the magnetic tape 3 as mentioned above by passing the signals through a modulator 19, recording amplifiers 20 and 21 and further leading to magnetic heads 16 and 17 through switches S1, S2, a slipring device 22. In case of this recording it is needless to say that the rotary disc 15 is rotated, and the rotating means are as follows:

Namely, the synchronizing signal contained in the television video signals impressing into the terminal 18 is separated by a synchronizing separator 24, rectangular waves obtained by the above step are reformed into sine waves and applied to a motor 27 through a motor drive amplifier 26 in order to rotate the rotary disc 15. In the same time, a part of the above mentioned rectangular waves (synchronizing signal) are led to a control track head 28 through a switch S3 and are recorded on an edge of the tape 3.

The above mentioned is a recording transmission channel for the video signal but the audio signal is recorded on another edge of the tape 3 by means of a sound recording and playback head 31 actuated by the audio signal applied to a terminal 29 and then through a sound recording amplifier 30 and a switch S5. In this instance, it will be needless to say that a sound erasing head 32 is made also in operation by an erasing current fed from the sound recording amplifier 30. Further, the above mentioned control track head 28, sound recording head 31 and sound erasing head 32 are installed within the above mentioned stationary magnetic head assembly 10.

After the recording is done in the above procedure, the reproducing of the recorded signal is effected as follows:

First of all, switches S1, S2 . . . S5 are turned to the counter direction to those shown in the drawings. When the magnetic tape 3 is transported in the same direction and speed as the recording time, the record rectangular waves (synchronizing signal) are reproduced from the control track head 28 and converted into the sine wave by a servo A 33 and servo B 25 and these sine wave signals are led to the motor 27 after amplified in the motor drive amplifier 26 and cause the motor to rotate at a predetermined speed (in this case, the speed is 30 r.p.s.) resulting alternative scanning of recorded tracks 23 on the magnetic tape 3 by magnetic heads 16 and 17.

Thus the above mentioned magnetic heads reproduce the FM signal taking out of the recorded tracks 23, each reproduced signal coming alternately from each head is fed alternately into reproducing amplifiers 34, 35 and is sent to a channel mixer 36. These reproduced signals are mixed so as to make two alternative signals into a series of a successive signal in the channel mixer 36. (The diagram after this shall be explained hereinafter.) In order to joint this respective signal into one successive signal, a series of cue signals to determine the time for the jointing is required and pulses induced electromagnetically for every half revolution of the motor 27 utilizing a tonewheel 37 fitted on a shaft of the motor 27 are applied on the channel mixer 36 to secure the correct jointing of the signals.

On the other hand, recorded sound signal is reproduced by means of the sound recording and playback head 31 utilizing it is a playback head, and the reproduced signal from the head is applied to a sound playback amplifier 38, then to a sound power amplifier 39. The output signal of the sound power amplifier drives the speaker 40 to reproduce the sound.

Figure 3:
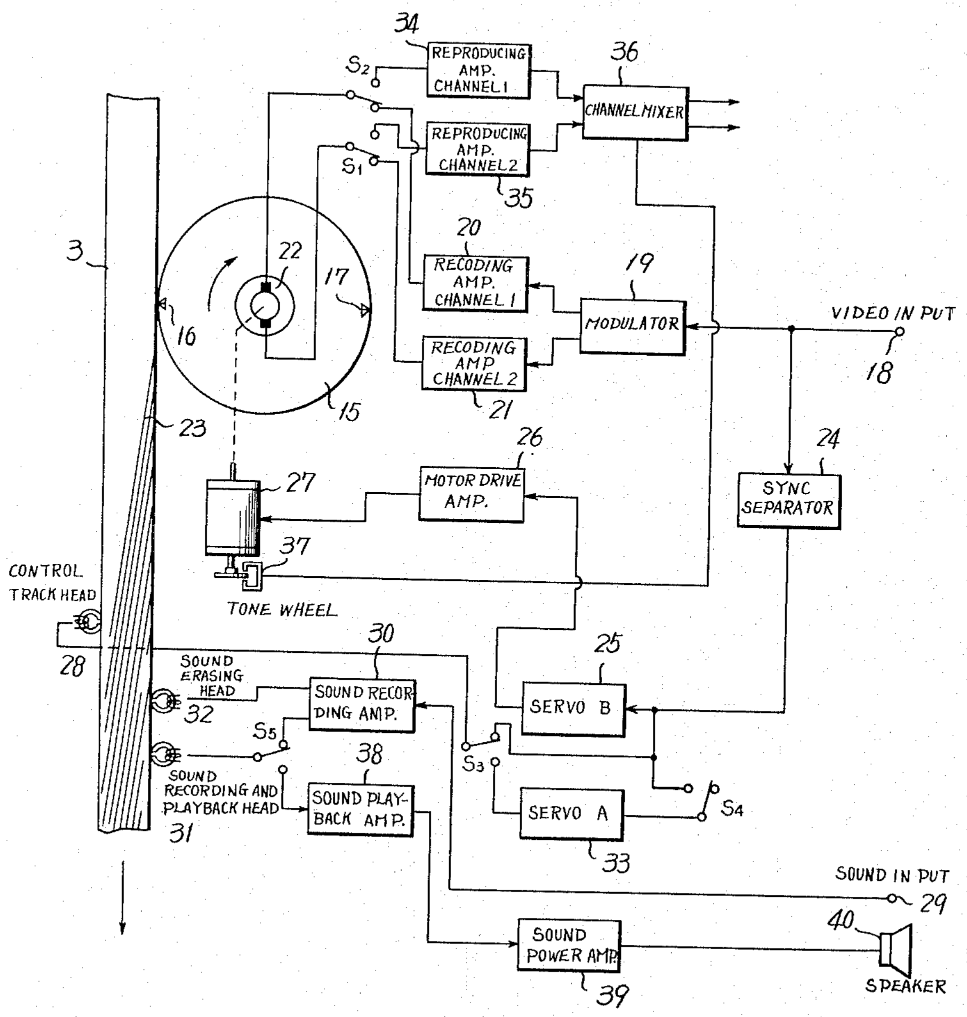
FIG. 3 is a circuit diagram illustrating a complete recording and reproducing apparatus incorporating the present invention system.
Figure 4:
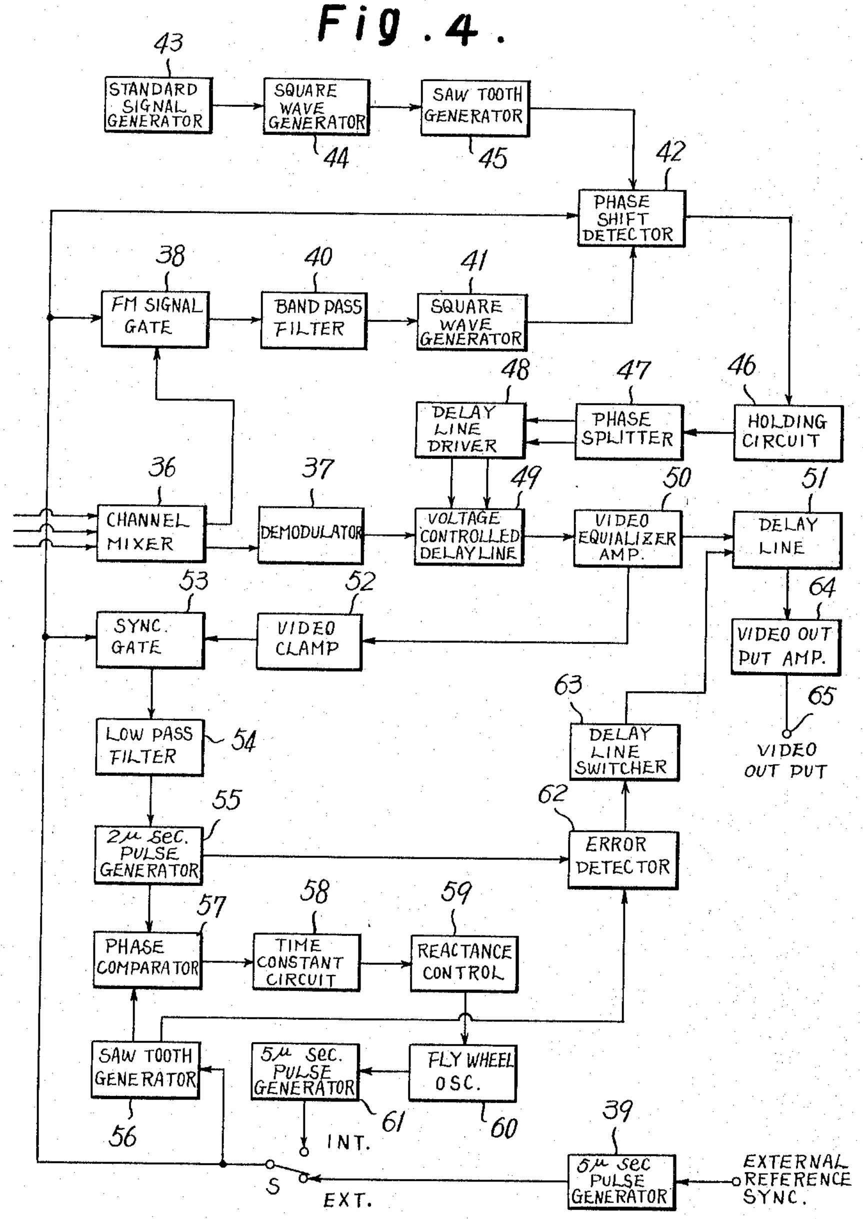
FIG. 4 is a circuit diagram for explaining the operation of the main parts according to the invention; and FIGS. *5a–5i* shows wave forms of the signals to be produced in the circuit elements shown in FIG. 4.

Now, referring to FIG. 4, one of the reproduced FM signal outputs jointed together into one successive signal in the channel mixer 36 is above explained with reference to FIG. 3 is supplied to a demodulator 37, while the other output is supplied to a FM signal gate 38. To the FM sgnal gate 38 is impressed a pulse shown in FIG. 5*a* having a repetition period of 63.5 μsec. and a pulse width of 5 μsec. from a 5 μsec. pulse generator 39. The FM signal gate 38 is caused to gate a FM signal corresponding to the synchronizing signal tip of the horizontal synchronizing signal of the reproduced signal during 5 μsec. The output of this FM signal gate 38 is supplied to a band pass filter 40 which filters out a signal having a wave form shown in FIG. 5*b* whose carrier component (for example 2 mc. component) only is supplied to a succeeding square wave generator 41. The signal shown in FIG. 5*b* has a repetition period of 63.5 μsec. and contains 2 mc. sine waves during 5 μsec. Then, the square wave generator 41 generates a square wave shown in FIG. 5*d* corresponding to the 2 mc. sine wave shown in FIG. 5*c*. The square wave thus generated is supplied to one of the inputs of a phase shift detector 42.

Figures 5A, 5B, 5C, 5D, 5E, 5F, 5G, 5H, 5I:
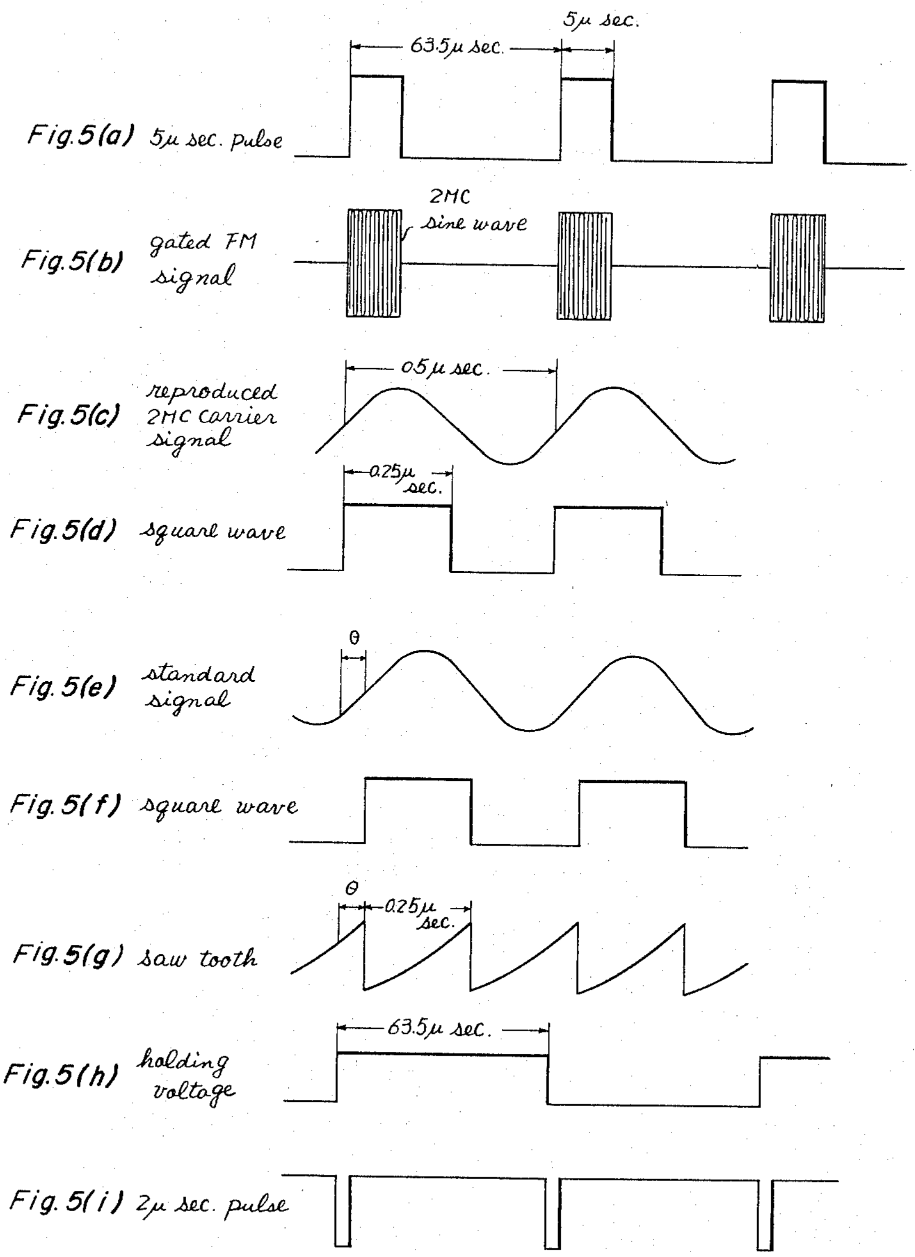

On the other hand, a standard signal generator 43 included in the system produces a wave shown in FIG. 5*e* 2 mc. sine wave) and corresponding to the synchronizing signal tip of the FM signal reproduced, which is supplied to a square wave generator 44 which generates a square wave shown in FIG. 5*f*. The output of the square wave generator 44 is supplied to a saw tooth generator 45 which produces a saw tooth wave having a repetition period of 0.25 μsec. shown in FIG. 5*g* that is supplied ot the other input terminal of the phase shift detector 42. The phase shift detector 42 has been supplied with the 5 μsec. pulse shown in FIG. 5*a* from the 5 μsec. pulse generator 39 such that the phase comparison can be effected during the period in which the square wave shown in FIG. 5*d* being supplied from the square wave generator 41, which results in a sampling of the saw tooth wave level shown in FIG. 5*g* supplied from the saw tooth generator 45 with the aid of the square wave shown in FIG. 5*d*. If the phase of the square wave shown in FIG. 5*d* is in coincidence with that of the saw tooth wave shown in FIG. 5*g*, the maximum level of the saw tooth wave shown in FIG. 5*g* is detected. If there is a deviation of 180° (0.25 μsec.) in phase between the two waves, the minimum level of the saw tooth wave shown in FIG. 5*g* is detected. The voltage wave thus detected and shown in FIG. 5*h* corresponds to any phase difference $\theta$, which is then supplied to a holding circuit 46, whose output is supplied to a phase splitter 47 which generates two square waves having opposite characteristics that control a voltage controlled delay line 49 through each delay line driver 48.

Separately from the above mentioned signal line, the FM signal supplied to the demodulator 37 is supplied to said voltage controlled delay line 49 which controls the time to pass through the delay line 49 per 63.5 μsec. with the detected voltage, that is, the output of the delay line driver 48.

Thus, an error of the time intervals of the reproduced video signal which has passed through the voltage controlled delay line 49 appears ever 0.25 μsec., so that such error is converted into a digital amount such as 0, ±0.25, ±0.50, ±0.75 . . . μsec. The reproduced video signal containing the error of the time intervals and converted into the digital amount is now supplied to a video equalizer amplifier 50 which operates to compensate for the characteristics of the reproduced video signal and one of whose outputs is supplied to a delay line 51. The other output of this video equalizer amplifier 50 is supplied to a video clamp 52 whose output is supplied to a synchronizing gate 53 which is adapted to gate the rising flank of the horizontal synchronizing signal with the aid of the 5 μsec. pulse shown in FIG. 5*a* supplied from the 5 μsec. pulse generator 39. The output of the synchronizing gate 53 is supplied through a low pass filter 54 to a 2 μsec. pulse generator 55 which generates 2 μsec. pulse shown in FIG. 5*i* which follows to the error of the time intervals of the rising flank of the synchronizing signal. The output of a saw tooth generator 56 of 5 μsec. pulse and that of the 2 μsec. pulse generator 55 are supplied to a phase comparator 57 whose output is supplied through a time constant circuit 58, a reactance control circuit 59, a fly wheel oscillator 60 and a 5 μsec. pulse generator 61 to an internal terminal INT. Thus, if a switch S is connected in the internal terminal INT or in an external terminal EXT connected to the 5 μsec. pulse generator 39 and the phase of the 5 μsec. pulse having a standard exterior or interior average value of the input signal shown in FIG. 5*a* is compared with that of the output of the 2 μsec. pulse generator 55 with the aid of the error detector 62, a voltage variation representative of the digital time intervals having 0.25 μsec. intervals can be obtained. Thus, this voltage variation corresponding to the error of the time intervals having 0.25 μsec. is supplied to a delay line switcher 63 which is caused to switch a delay line 51 divided with the time intervals of 0.25 μsec., thereby digitally controlling the time delay every 63.5 μsec. from the one rising flank of the horizontal synchronizing signal of the reproduced video signal to the next rising flank of the horizontal synchronizing signal. The output of the delay line 51 is supplied to a video output amplifier 64 whose output is derived from a terminal 65.

As can be seen from the above, the present invention renders it possible to provide a system for correcting a video signal for use in a magnetic television video signal recording and reproducing apparatus wherein the phase of a carrier wave having a given frequency of the reproduced signal is compared with that of a standard signal having a frequency corresponding to the carrier frequency and a voltage equal to the difference between the two is detected and the voltage thus detected is used to control a variable time delay means supplied with the demodulated video signal. The system according to the invention has advantages that an excellent and stabilized television picture image having substantially no jitter can be obtained by correcting the error of the time intervals of the reproduced video signal.

Though the invention is described by means of an embodiment as shown in the drawings, yet various modifications can of course be made without departing from the scope of the claim.

What we claim is:

1. A system for correcting a video signal comprising means for taking a carrier wave of a predetermined frequency during a period of time corresponding to a pulse width of a horizontal synchronizing pulse at every period thereof out of a reproduced frequency modulated video signal, means for generating a standard signal of a frequency equal to said carrier frequency, a first means for comparing the phase of the carrier wave developed from said carrier wave taking means with that of the standard signal developed by said standard signal generating means, means for demodulating said reproduced frequency modulated video signal, a first variable delay circuit for delaying the video signal demodulated by said demodulating means corresponding to a digital output of said first phase comparing means, means for forming a pulse corresponding to a build-up timing error of the horizontal synchronizing pulse from the output of said first variable delay circuit, a second means for comparing the phase of the pulse developed from said pulse forming means with that of a standard horizontal synchronizing pulse, and a second variable delay circuit for delaying digitally the output of said first variable delay circuit corresponding to the output of said second phase comparing means.

2. A system for correcting a video signal as defined in claim 1, including a circuit which comprises a pulse generator developing pulses having a pulse width of 5 $\mu$sec. and a period of 63.5 $\mu$sec., means for forming a saw tooth wave from the pulse developed from said pulse generator, means for comparing the phase of the saw tooth wave from said forming means with that of the pulse developed from a pulse forming means corresponding to the build-up timing error of the horizontal synchronizing pulse from the output of said first variable delay circuit, and a fly wheel oscillator driving by the output of said phase comparing means for operating said puse generator.

3. A system for correcting a video signal as defined in claim 1, wherein the carrier wave developed from said carrier wave taking means is of 2 mc. and the video signal delayed by said first variable delay circuit has a digital error corresponding to the time interval error in every 0.25 $\mu$sec.

4. A system for correcting a video signal comprising means for taking a carrier wave of a predetermined frequency during a period of time corresponding to a pulse width of a horizontal synchronizing pulse at every period thereof out of a reproduced frequency modulated video signal, means for forming a rectangular wave from the carrier wave of said taking means, means for generating a standard signal of a frequency equal to said carrier frequency, means for forming a saw tooth wave from the standard signal developed from said generating means, a first means for comparing the phase of the rectangular wave developed from said rectangular wave forming means with that of the saw tooth wave developed from said saw tooth wave forming means and generating a digital holding voltage corresponding to the phase difference, means for demodulating said reproduced frequency modulated video signal, a first voltage control type variable delay circuit for delaying the video signal demodulated by said demodulating means corresponding to the holding voltage developed from said first phase comparing means, means for forming a pulse corresponding to the build-up timing error of the horizontal synchronizing pulse from the output of said first variable delay circuit, a second means for comparing the phase of the pulse from said pulse forming means with that of a reference horizontal synchronizing pulse, a delay line switcher operating corresponding to the output of said second phase comparing means, and a second variable delay circuit for delaying digitally the output of said first variable delay circuit by said switcher.

References Cited

UNITED STATES PATENTS

| | | | |
|---|---|---|---|
| 2,960,568 | 11/1960 | Leyton | 178—6.6 |
| 3,210,464 | 10/1965 | Von Fegel-Farnholz | 178—6.6 |
| 3,235,662 | 2/1966 | Bopp | 178—6.6 |

JOHN W. CALDWELL, *Primary Examiner.*

DAVID G. REDINBAUGH, *Examiner.*

H. W. BRITTON, *Assistant Examiner.*